(12) United States Patent
Cyganski et al.

(10) Patent No.: US 8,928,459 B2
(45) Date of Patent: Jan. 6, 2015

(54) PRECISION LOCATION METHODS AND SYSTEMS

(75) Inventors: David Cyganski, Holden, MA (US); R. James Duckworth, Shrewsbury, MA (US); John A. Orr, Holden, MA (US); William R. Michalson, Douglas, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 1047 days.

(21) Appl. No.: 12/664,844

(22) PCT Filed: Jun. 13, 2008

(86) PCT No.: PCT/US2008/007446
§ 371 (c)(1),
(2), (4) Date: Jul. 13, 2010

(87) PCT Pub. No.: WO2008/156700
PCT Pub. Date: Dec. 24, 2008

(65) Prior Publication Data
US 2010/0277339 A1 Nov. 4, 2010

Related U.S. Application Data

(60) Provisional application No. 60/934,880, filed on Jun. 15, 2007, provisional application No. 61/069,500, filed on Mar. 14, 2008.

(51) Int. Cl.
*G08B 5/22* (2006.01)
*G01S 1/02* (2010.01)
*G01S 5/02* (2010.01)

(52) U.S. Cl.
CPC .. *G01S 1/026* (2013.01); *G01S 5/02* (2013.01)
USPC ............ 340/8.1; 340/7.1; 340/9.1; 340/10.1; 340/11.1; 340/12.1; 340/13.1; 340/13.2; 340/13.37; 340/14.1; 340/539.13; 340/539.15; 340/539.16; 340/539.17; 340/539.21; 340/539.22; 375/267; 375/295

(58) Field of Classification Search
USPC ............ 340/539.13, 539.15, 539.16, 539.17, 340/539.21, 539.22; 375/266, 267, 295
See application file for complete search history.

(56) References Cited

U.S. PATENT DOCUMENTS 2,869,117 A * 1/1959 Berger et al. .................... 342/76
2,913,595 A * 11/1959 Kaufmann .................... 307/416

(Continued)

FOREIGN PATENT DOCUMENTS

WO WO 2007084673 A2 * 7/2007
WO WO-2008156700 A2 12/2008

OTHER PUBLICATIONS

Cyganski et al. "WPI Precision Personnel Locator System," ION NTM 2007, pp. 806-814 (Jan. 24, 2007).

(Continued)

*Primary Examiner* — George Bugg
*Assistant Examiner* — Paul Obiniyi
(74) *Attorney, Agent, or Firm* — Ropes & Gray LLP

(57) ABSTRACT

Systems and methods are described herein for determining the location of a transmitter by jointly and collectively processing the full sampled signal data from a plurality of receivers to form a single solution.

20 Claims, 7 Drawing Sheets

(56) References Cited

U.S. PATENT DOCUMENTS

| | | | |
|---|---|---|---|
| 2,932,012 A * | 4/1960 | Jorgensen | 365/80 |
| 4,007,493 A * | 2/1977 | Behr et al. | 360/77.07 |
| 4,542,367 A * | 9/1985 | Shreve | 341/137 |
| 4,561,849 A * | 12/1985 | Eichweber | 434/22 |
| 5,280,457 A | 1/1994 | Figueroa et al. | |
| 5,332,999 A * | 7/1994 | Prati et al. | 342/25 F |
| 5,719,584 A | 2/1998 | Otto | |
| 5,719,899 A * | 2/1998 | Thielecke et al. | 375/144 |
| 5,767,804 A * | 6/1998 | Murphy | 342/357.31 |
| 5,926,133 A | 7/1999 | Green, Jr. | |
| 5,999,131 A | 12/1999 | Sullivan | |
| 6,063,129 A * | 5/2000 | Dadd et al. | 703/7 |
| 6,084,546 A * | 7/2000 | Wax et al. | 342/378 |
| 6,160,757 A | 12/2000 | Tager et al. | 367/119 |
| 6,314,149 B1 * | 11/2001 | Daffron | 375/371 |
| 6,363,121 B1 | 3/2002 | Hochwald et al. | 375/260 |
| 6,515,622 B1 * | 2/2003 | Izadpanah et al. | 342/368 |
| 6,539,393 B1 * | 3/2003 | Kabala | 1/1 |
| 6,724,842 B1 | 4/2004 | Hochwald et al. | 375/347 |
| 6,901,971 B2 | 6/2005 | Speasl et al. | 141/1 |
| 7,080,061 B2 | 7/2006 | Kabala | 1/1 |
| 7,228,228 B2 * | 6/2007 | Bartlett et al. | 701/517 |
| 7,248,167 B2 * | 7/2007 | Wassingbo | 340/572.1 |
| 7,327,795 B2 * | 2/2008 | Oprea | 375/260 |
| 7,327,800 B2 * | 2/2008 | Oprea et al. | 375/267 |
| 7,440,490 B2 * | 10/2008 | Kidiyarova-Shevchenko et al. | 375/148 |
| 7,668,268 B2 * | 2/2010 | Heiskala | 375/348 |
| 7,720,172 B2 * | 5/2010 | Nakagawa et al. | 375/295 |
| 7,844,352 B2 * | 11/2010 | Vouzis et al. | 700/44 |
| 8,036,286 B2 * | 10/2011 | Lee et al. | 375/260 |
| 8,059,733 B2 * | 11/2011 | Khojastepour et al. | 375/260 |
| 8,144,795 B2 * | 3/2012 | Ihm et al. | 375/267 |
| 8,155,254 B2 * | 4/2012 | Li et al. | 375/346 |
| 2003/0191767 A1 * | 10/2003 | Kabala | 707/100 |
| 2003/0218973 A1 * | 11/2003 | Oprea et al. | 370/210 |
| 2004/0043774 A1 * | 3/2004 | Lee | 455/456.1 |
| 2004/0101163 A1 * | 5/2004 | Kumagai et al. | 382/103 |
| 2004/0120299 A1 * | 6/2004 | Kidiyarova-Shevchenko et al. | 370/342 |
| 2004/0190636 A1 * | 9/2004 | Oprea | 375/260 |
| 2004/0192218 A1 * | 9/2004 | Oprea | 455/73 |
| 2006/0093185 A1 * | 5/2006 | Kato et al. | 382/103 |
| 2006/0189280 A1 * | 8/2006 | Goldberg | 455/101 |
| 2006/0244661 A1 | 11/2006 | Orr et al. | |
| 2006/0270352 A1 * | 11/2006 | Webster et al. | 455/63.4 |
| 2007/0184852 A1 * | 8/2007 | Johnson et al. | 455/456.1 |
| 2007/0222685 A1 * | 9/2007 | Kuo | 343/700 MS |
| 2007/0268981 A1 * | 11/2007 | Heiskala | 375/267 |
| 2008/0136267 A1 * | 6/2008 | Laabs et al. | 310/12 |
| 2008/0163363 A1 * | 7/2008 | Mizutani | 726/19 |
| 2008/0317157 A1 * | 12/2008 | Ihm et al. | 375/267 |
| 2010/0158170 A1 * | 6/2010 | Li et al. | 375/346 |
| 2011/0110450 A1 * | 5/2011 | Gomadam et al. | 375/267 |

OTHER PUBLICATIONS

Yuan et al. "Location Sensing in Enhanced IEEE802.11e WLANs". Advanced Information Networking and Applications, 2006. AINA 2006. 20th International Conference on Vienna, Austria, Apr. 18-20, 2006, IEEE XP010915400, pp. 423-428.

* cited by examiner

PRECISION LOCATION METHODS AND SYSTEMS

GOVERNMENT CONTRACT

The U.S. Government has a paid-up license in this invention and the right in limited circumstances to require the patent owner to license others on reasonable terms as provided for by the terms of Contract No. 2003-U-CX-K025 awarded by the National Institute of Justice.

CROSS-REFERENCE RELATED APPLICATION

This application is a national stage filing under 35 U.S.C. 371 of International Application No. PCT/US2008/007446, filed on Jun. 13, 2008, which claims the benefit of U.S. Provisional Application Ser. No. 60/934,880, filed Jun. 15, 2007, entitled Precision Location Methods and Systems, and U.S. Provisional Application Ser. No. 61/069,500, filed Mar. 14, 2008, entitled Precision Location Methods and Systems, the entire contents of both of which are incorporated herein by reference in their entirety. International Application No. PCT/US2008/0074463 was published under PCT Article 21(2) in English.

FIELD OF THE INVENTION

The present invention relates to locating objects by means of radio signals. More specifically, this invention relates to systems and methods for locating objects in high multi-path environments precisely using a multi-signal fusion approach.

BACKGROUND OF THE INVENTION

The precise tracking of persons and/or objects is desirable in many applications. One way to achieve precision indoor location with electronic tracking systems is by ranging (estimating the distance) between one or more base stations and a mobile locator device. Known examples of electronic locating systems that perform ranging are GPS technology, in which satellite transmissions are used by mobile receivers to determine the position of the mobile receivers, and cell phone location systems, where tower-located base station receivers estimate the location of mobile hand-held cell phone transmitters.

However, in the past, several factors have hindered the use of known electronic locating systems in indoor environments. One major impediment to the use of known locator systems is multi-path signal contamination, referring to the signal scattering effect caused by the local environment between the transmitter and the receiver, such as walls and support beams. Other impediments include insufficient signal strength, lack of precision, the FCC spectrum non-compliance of ultra wide band systems, the need for pre-existing infrastructure, and failure of simple pulse distortion models in actual through-building and multi-path propagation conditions.

SUMMARY OF THE INVENTION

In view of the foregoing, it would be desirable to have a locator system that has the capability to operate in high multi-path environments. It would also be desirable to have a locator system that can resolve location precisely with a relatively narrow bandwidth signal. It further would be desirable to have a locator system that does not require precise phase relationships between receiver radio frequency electronics. It would also be desirable to have a locator system that does not require a pre-existing infrastructure.

In accordance with these and other objects of the present invention, precision locator methods and systems are described. The present invention alleviates the problems associated with known locator systems. Accordingly, the present invention has the capability to operate in high multi-path environments, can deliver location precisely with a relatively narrow bandwidth signal, generally does not require precise phase relationships between receiver radio frequency electronics, and does not require a pre-existing infrastructure.

BRIEF DESCRIPTION OF THE DRAWINGS

The above and other advantages of the present invention will become apparent upon consideration of the following detailed description, taken in conjunction with the accompanying drawings, in which like reference characters refer to like parts throughout, and in which.

DETAILED DESCRIPTION OF THE INVENTION

To provide an overall understanding of the invention, certain illustrative embodiments will now be described, including systems and methods for determining the location of a transmitter or receiver. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

The degradation of performance caused by the multi-path signal contamination described above is generally addressed in the present invention by application of a new diversity signal combining and position solution approach. This new "multi-signal fusion" approach solves for the location (in 2D or 3D space) using multiple received signals entirely, simultaneously and integrally, and not by combining several independently obtained time delay solutions, as with Time of Arrival (TOA) methods, or by combining several independently obtained time difference solutions, as with Time Difference of Arrival (TDOA) methods, determined respectively from each individual received signal or pairs of such signals. A region of potential transmitter positions is scanned and applied as trial solutions until the unification of essential aspects of the direct path components of the aligned receiver signals is achieved.

Figure 1A:
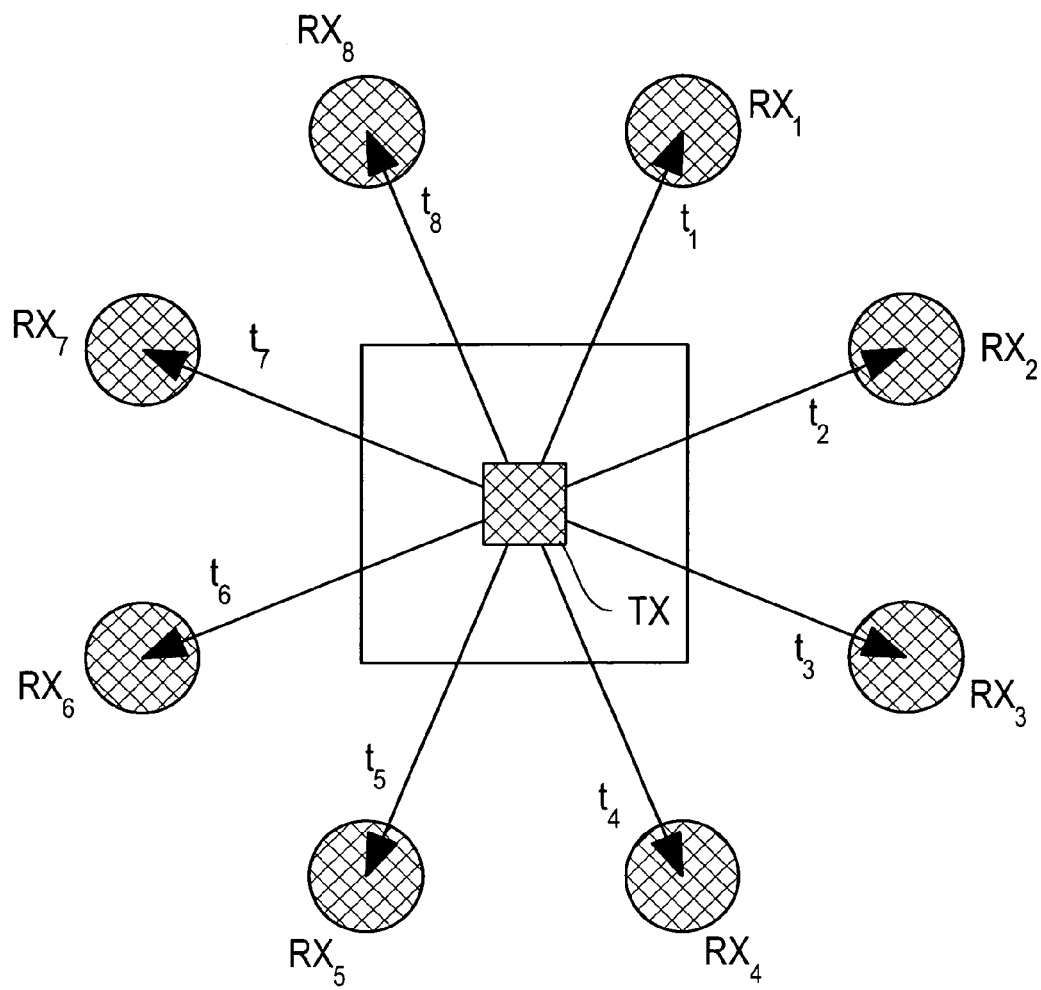
FIG. 1A is an illustrative diagram of the geometry and fundamental signal propagation delays of an exemplary locator system consistent with the principles of the present invention.

The geometry and fundamental signal propagation delays of an exemplary locator system consistent with the principles of the present invention are depicted in FIG. 1A. In this figure, a transmitter (TX) is shown inside a building which is surrounded by 8 receivers ($RX_1$-$RX_8$). A propagation delay, $t_n$ is associated with the signal path from the transmitter to the nth receiver.

Figure 1B:
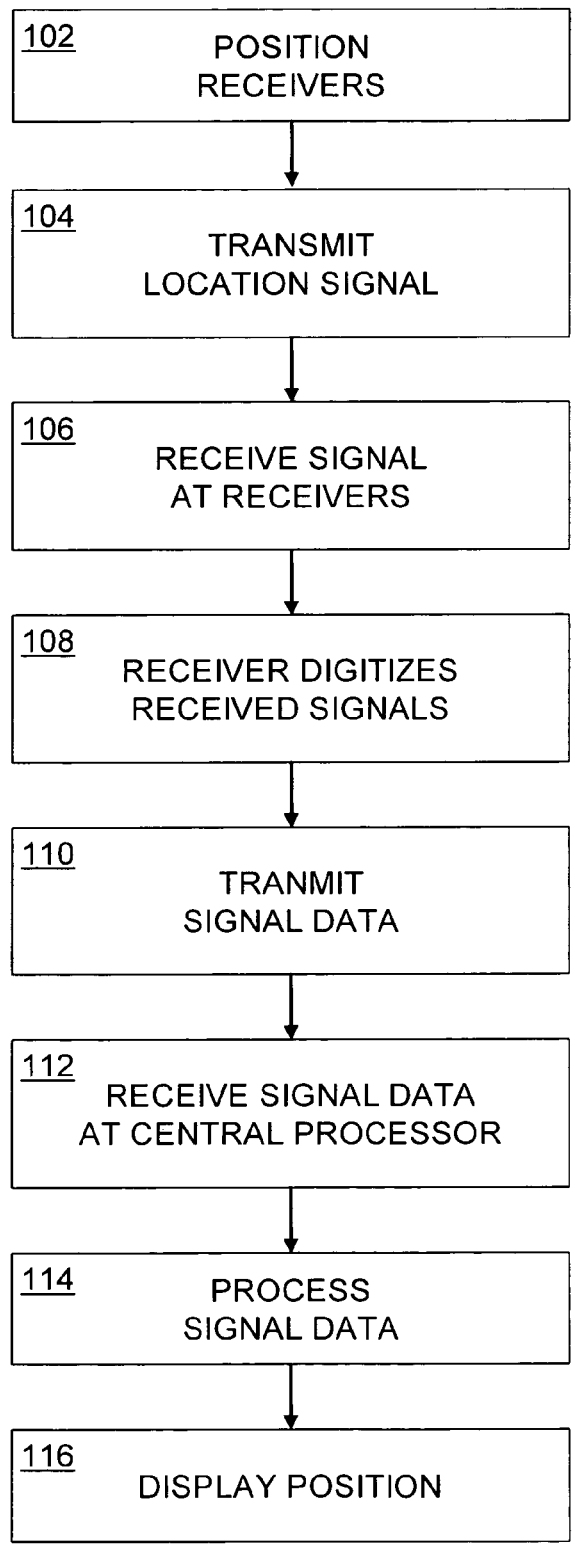
FIG. 1B is a flow chart of a method of determining the location of a transmitter, according to an illustrative embodiment of the invention.

FIG. 1B is a flow chart of a method of determining a location of a transmitter in the environment described above in FIG. 1A, according to an illustrative embodiment of the invention. The method begins with the positioning of the plurality of receivers RX about a region in which the transmitter TX is located (step 102). For example, the receivers RX may be positioned around a building in which a firefighter carrying the transmitter TX is operating. Results tend to improve as the number of receivers RX and the diversity of location and heights used increases. Preferably the receivers RX substantially surround the region in question. For example, for the case of a generally rectangular building, receivers RX are preferably positioned along three sides of the building, though usable results may be achieved by positioning receivers RX along only two sides of the building. In addition, particularly in situations in which positioning receivers around a building is not practical, additional receivers may be positioned within the building at various locations.

Next, the transmitter TX begins transmission of a location signal (step 104). The location signal is preferably composed of unmodulated RF base band signals at a plurality of frequencies. Preferably the frequencies are selected to be sufficiently close that differences in their phase shifts due to intervening material properties (for example, from passing through walls and other building materials) are negligible.

The receivers RX receive the location signal at their respective locations (step 106). The receivers RX digitize the received location signal (step 108) using an analog to digital converter. The receivers RX then transmit data corresponding to the received signal to a central processor (step 110). In various implementations, the data includes, for example, a Fourier domain representation of the signal, or raw samples of the received signal. The signal data may be transmitted over a hardwired link, or a wireless link, for example, using an 802.11 based protocol. In one embodiment, a single device includes both one of the receivers RX and the central processor.

The central processor then receives (step 112) the signal data from the receivers and processes them in a unified, collective fashion (step 114). More particularly, the central processor processes the signal data based on the following principles:

If the actual distance from the transmitter to a given receiver were known, the difference in phase between a transmitted signal and the signal as it is received by the receiver can be accounted for, but for a phase shift caused by a time offset in the local oscillator of the receiver and by specific characteristics of the channel (for example, the types of materials the signal propagated through from the transmitter to the receiver);

The bandwidth of the transmitted signal can be set to be sufficiently narrow that the phase shift caused by channel characteristics is, for all practical purposes, frequency independent.

The phase shift caused by the time offset of the local oscillator is also frequency independent.

Thus, ignoring multi-path issues, assuming the receipt of signal data from at least four receivers, there is only one set of propagation delays, i.e., one set of transmitter-receiver distances and one transmitter location, which if subtracted from the signals received by the transmitters, would result in each of the received signals being different from the transmitted signal by a receiver dependent, but frequency independent, constant phase. If constraints on potential positions are assumed, fewer received signals may be sufficient.

Absent issues of multi-path, any other position would result in a frequency dependent phase shift in addition to the frequency independent phase shift between the signals received by the receivers.

Based on the above principles, by comparing characteristics of the received signals at a set of possible transmitter locations, one or more locations can be identified as likely actual locations. Thus, the processing (step 114) carried out by the central processor includes comparing each of the received signals at each of a plurality of assumed positions and identifying specific locations as being likely transmitter locations. More particularly, this processing is based upon an evaluation of a metric for each potential transmitter position $[x_k, y_k, z_k]$ in the region of interest based on the received signals. Ultimately a 2D or 3D metric function is formed in which peak values identify the transmitter position and possibly the positions of strong signal reflectors in the region of interest. Knowledge of the positions of signal reflectors, while not critical to the end user, can provide useful engineering and diagnostic data. After likely transmitter positions are determined in step 114, the positions are displayed to a user step 116.

Strategies for accelerating the formation and search of the region can be utilized to reduce the computational requirements for location determination. For example, a coarse grained scan of a region of interest can be carried out, followed by a fine grained search on identified areas of interest within the scanned region. This process can further be improved by interpolating the results of the coarse search to narrow the areas of interest. Both Lagrangian and Spline interpolation methods, among others, are suitable for this purpose. In addition, or in the alternative, the search can be expedited by using gradient search methods known in the art.

Figure 1C:
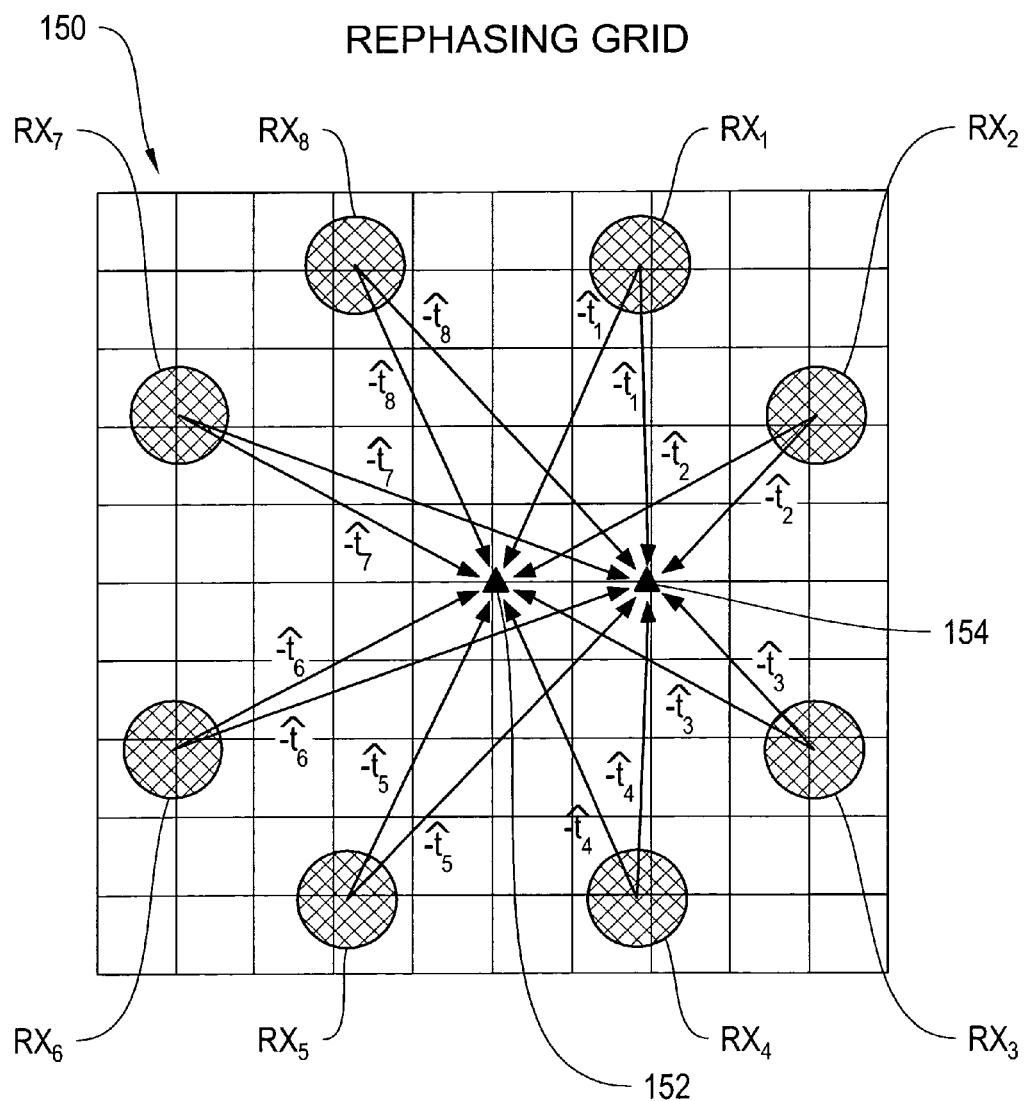
FIG. 1C is a diagram of a rephasing grid illustrating one of the principles behind the multi-signal fusion processing approach described herein.

FIG. 1C is a diagram of a rephasing grid 150 illustrating one of the principles behind the multi-signal fusion processing approach described herein. The rephasing grid 150 identifies the fixed position of eight receivers $RX_1$-$RX_8$, depicted on grid as circles. In addition, the grid displays the inverse of signal delays $\hat{t}_n$ (i.e., the signal delay expected if the transmitter TX were in fact located at that position) associated with two potential positions 152 and 154 of a transmitter, depicted as a triangle. In deriving the metric at each of the potential positions, the central processor generally applies the inverse of signal delay $\hat{t}_n$ to each received signal, $R_n(t)$, so that a set of aligned received signals, $$R'_n(t) = R_n(t + \hat{t}_n) = ax(t)e^{j\phi}$$

is formed, where a is an amplitude factor which is a function of all the amplitudes of the direct path received components received at the receiving antennas. In the equation, $R_n(t)$ denotes a signal received at the nth receiver, and $R'_n(t)$ is an aligned or range re-phased received signal. That is, $R'_n(t)$ corresponds to the signal R(t) had it not traveled a distance that would result in a propagation delay of $\hat{t}_n$. In the equation, x(t) is the transmitted signal, $a_n e^{j\phi_n}$ is the amplitude and phase by which the aligned received signal $R'_n(t)$ differs from the transmitted signal x(t). In analyzing a set of potential transmitter locations (for example, in step 114 of FIG. 1B), if a potential transmitter location corresponds to the correct transmitter location, the rephased received signals from each receiver are identical to within a constant amplitude and phase factor of each other. Thus, the ultimate goal of the multi-signal fusion based location estimation process is to find the location which results in the above unification of the aligned signals.

Figure 2:
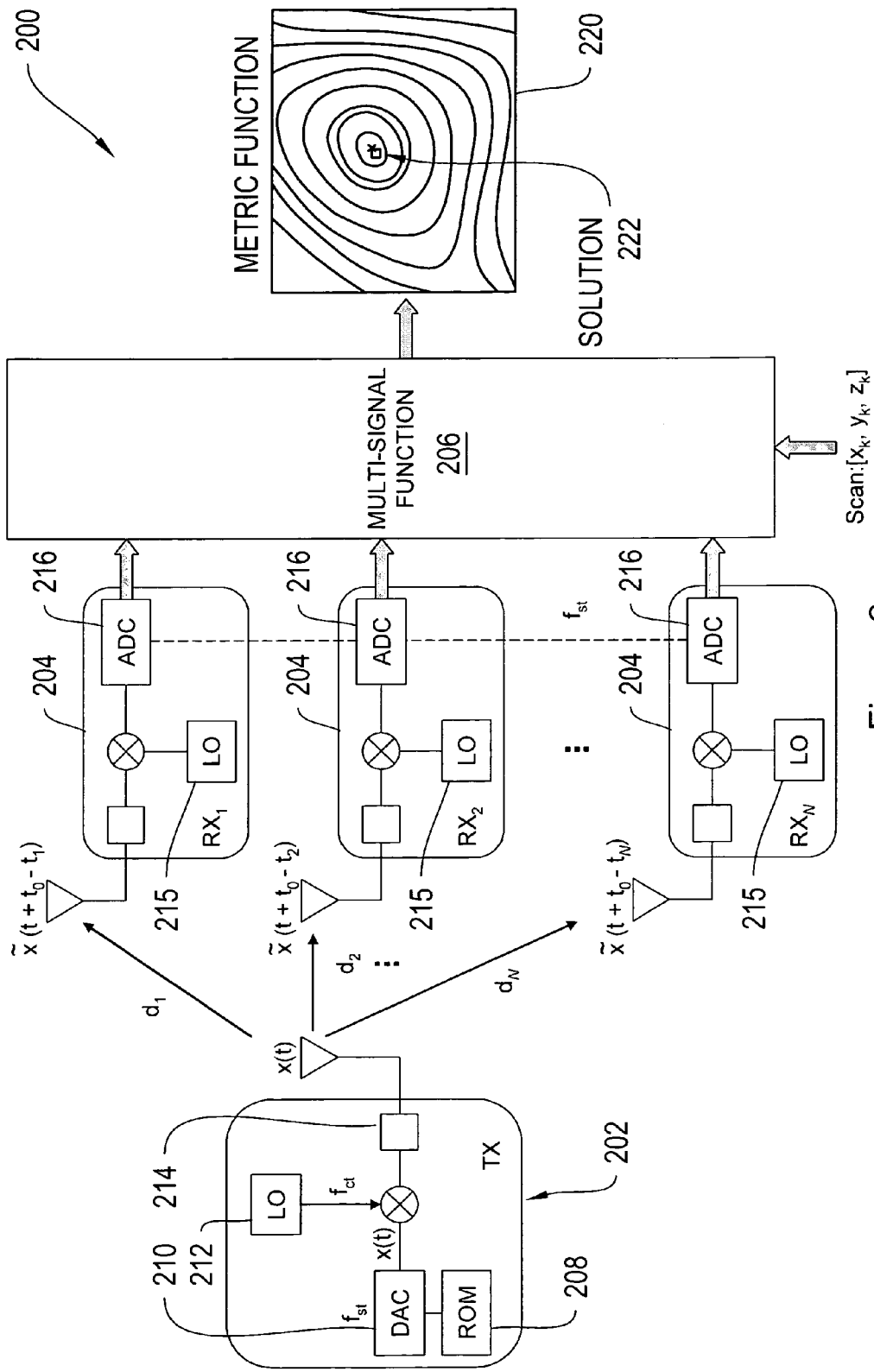
FIG. 2 is an illustrative diagram depicting the overall processing scheme used in an embodiment of the locator system of the present invention.

FIG. 2 is a functional block diagram of a system 200 for determining location used in an embodiment of the locator system of the present invention. The system includes at least one locator device 202, multiple receivers 204, and a multi-signal fusion processor 206. The locator device 202 includes a memory 208 for digitally storing a locator waveform, a digital to analog converter 210 for converting the digital waveform into an analog waveform, a local oscillator 212 for upconverting the analog waveform, and a transmitter 214 for transmitting the upconverted analog locator waveform.

The receivers 204 include a receiver, a local oscillator 215 to downconvert received locator signals, and an analog to digital converter 216 to digitize the downconverted signal. The receivers forward the digitized signal, for example in the form of a plurality of signal samples of the received signals, to the multi-signal fusion processor 206. The multi-signal fusion processor 206 could be a stand alone system, such as is described in relation to FIGS. 4 and 5, or it may be incorporated into one of the receivers 204. As is shown in FIG. 2, the full sampled signal data from all of the receivers 204 is jointly processed to form a single solution. As indicated above, this processing is based upon an evaluation of a metric for each potential transmitter position [xk,yk,zk] in the region of interest based on scanned signal data from the receivers. By way of illustration, example results of such a metric function 220 is shown in FIG. 2 for the case of a 2D region scan and a single transmitter with no multi-path interference. In one embodiment, the metric function is output in intensity and color. For purposes of illustration, variations in color are depicted in FIG. 2 as topographical contours. With brightness encoding the magnitude of the metric, the peak indicated by the brightest location (identified as solution 222) in the space identifies the transmitter position.

One embodiment of the processing step 114 of FIG. 1B is referred to herein as singular array reconciliation tomography ("SART"). As described above in relation to FIG. 1B, the processor determines a metric at a set of trial locations within a region in which the transmitter is believed to be located. In SART, this metric for a trial location is the first singular value of the singular value decomposition (SVD) of a matrix formed from the signals $R_n$ received by n receivers rephased based on the distances between the receivers R and the trial position. The matrix for the trial position is formed as follows.

Using SART, for a trial position, the range rephased signal received by the nth receiver is given by $$R'_n(t) = a_n x(t - t_n + \hat{t}_n + t_o) e^{j\phi_n},$$

where $a_n$ represents the total system gain at the $n_{th}$ receiver, $\phi_n$ is the total frequency independent phase shift (i.e., the time shift caused by channel specific characteristics and an offset in the nth receiver's local oscillator), $\hat{t}_n$ is the channel-independent time delay of the transmitted signal from the trial position to the nth receiver, $t_n$ is the time delay due to propagation of the transmitted signal from the transmitters actual position, and $t_o$ is offset between the transmitter clock and that of a common clock shared by all receivers.

The nth column of the matrix referred to above is populated with a discrete frequency vector representation of the signal received by the nth receiver rephased based on a distance corresponding to a trial position. The nth column vector is represented as follows:

$$R'_n = \begin{bmatrix} R'_n(0) \\ R'_n(1) \\ \vdots \\ R'_n(m) \end{bmatrix}$$

$$= \begin{bmatrix} c_n X'(0) e^{j\omega_0(\hat{t}_n - t_n)} \\ c_n X'(1) e^{j\omega_1(\hat{t}_n - t_n)} \\ \vdots \\ c_n X'(m) e^{j\omega_m(\hat{t}_n - t_n)} \end{bmatrix}$$

where X' corresponds to a discrete vector representation of the transmitted signal rephased to take into account the offset, $t_o$, between the transmitter's clock and the common receiver clock; $c_n$ corresponds to the frequency independent phase offset corresponding to the nth receiver; and $\omega_m$ is the frequency of the $m_{th}$ discrete Fourier component of the received signal. Thus, $R'_n$, at a trial location, is a function of the presumed values of the distances between the receivers and the trial position.

For a trial position, the columns of a matrix R' are populated in the following fashion $$R' = \begin{bmatrix} R'_1(0) & R'_2(0) & \cdots & R'_N(0) \\ R'_1(1) & R'_2(1) & \cdots & R'_N(1) \\ \vdots & \vdots & \ddots & \vdots \\ R'_1(m) & R'_2(m) & \cdots & R'_N(m) \end{bmatrix}$$

$$= \begin{bmatrix} c_1 X'(0) e^{j\omega_0(\hat{t}_1 - t_1)} & c_2 X'(0) e^{j\omega_0(\hat{t}_2 - t_2)} & \cdots & c_N X'(0) e^{j\omega_0(\hat{t}_N - t_N)} \\ c_1 X'(1) e^{j\omega_1(\hat{t}_1 - t_1)} & c_2 X'(1) e^{j\omega_1(\hat{t}_2 - t_2)} & \cdots & c_N X'(1) e^{j\omega_1(\hat{t}_N - t_N)} \\ \vdots & \vdots & \ddots & \vdots \\ c_1 X'(m) e^{j\omega_m(\hat{t}_1 - t_1)} & c_2 X'(m) e^{j\omega_m(\hat{t}_2 - t_2)} & \cdots & c_N X'(m) e^{j\omega_m(\hat{t}_N - t_N)} \end{bmatrix}$$

If the target position is not the correct distance away from the nth receiver, $\hat{t}_n$ will not equal $t_n$. As can be seen in the above equation, this results in the rephased signal $R'_n$ including non-zero phase shifts, which vary for each carrier in relation to their frequency, $\omega_m$. In the case of equally spaced frequency samples as arise for DFT signal decomposition, these phase shifts linearly progress with increasing row index. In the specific case wherein the presumed position is the actual target position (as designated by the tilda), for all receivers, $\hat{t}_n$ will equal $t_n$, thereby canceling out the frequency dependent phase shift, resulting in the following simplified matrix:

$$\tilde{R}' = \begin{bmatrix} c_1 X'(0) & c_2 X'(0) & \cdots & c_N X'(0) \\ c_1 X'(1) & c_2 X'(1) & \cdots & c_N X'(1) \\ \vdots & \vdots & \ddots & \vdots \\ c_1 X'(m) & c_2 X'(m) & \cdots & c_N X'(m) \end{bmatrix}$$

As can be seen, in the $\tilde{R}'$ matrix, all of the columns of the matrix match to within the complex scalar constant, $c_n$.

The SVD of a matrix takes an arbitrary matrix, M, into a matrix product representation, $M = U\Sigma V^H$ in which U and V are unitary matrices (where superscript H indicates the Hermertian operator which obtains the complex conjugate transpose of the quantity indicated), and $\Sigma$ is a diagonal matrix with non-negative real elements $\sigma_1 > \sigma_2 > \ldots \sigma_n$ known as the singular values of the matrix. The SVD decomposition is said to be a rank-revealing decomposition as only $\sigma_1$ through $\sigma_k$ are non-zero for a matrix of rank k, and a rank k matrix which has been slightly perturbed by errors has nearly zero values for $\sigma_{k+1}$ through $\sigma_n$. Thus the size of $\sigma_1$ as compared to the other singular values is a robust measure of the extent to which all the columns of a matrix match to within a scalar constant of each other. As this is the exact condition that indicates that a trial location is the correct position of a transmitter, as described above, the SVD makes an ideal metric of the likelihood that a trial position corresponds to a correct transmitter location.

The above discussion has been couched within the simplified model of a single direct path signal at all receivers. However, the rank revealing properties of singular value decomposition ("SVD") yields a process that is not only robust but also informational in the realistic case of operation in environments that corrupt the received direct path signal with multi-path components. During a scan of potential transmitter locations, the singular value decompositions of the $R'_n$ matrices for locations of prominent reflectors will yield high first singular values in a similar fashion as the true transmitter location. The prominent reflectors can be distinguished from one another to identify the actual transmitter location in two ways. First, the first singular value associated with the true transmitter location in most, but not all, cases is greater than the first singular value associated with reflector positions. Thus, in one implementation, reflector positions having significant, but smaller first singular values can be ruled out as possible transmitter locations in favor of locations with greater first singular values. In addition, the SVD processing of the $R'_n$ matrix yields additional information about the signals received by the receiver. In particular, the columns of the U matrix referred to above include the Fourier components, including a phase shift corresponding to a time delay, of the signal that generated the agreement between phases of the various frequency components (i.e., the direct path signal for the true location and the reflected signal for the reflector location), and hence yielded the higher first singular value. The direct path signal would arrive at the receiver first. Thus, out of the multiple potential transmitter locations, the true transmitter location can be identified by selecting the location whose U matrix indicates the smallest time delay for the column corresponding to the first singular value.

Likewise, if the assumed position coincides with a reflector position, thanks to SART's immunity to overall propagation delay, a metric peak stemming from a large singular value is again generated with the direct path contributions this time being dispersed. Hence, an image-like portrayal of the SART metric will depict as peaks the locations of the true transmitter and each prominent reflector, as seen in FIG. 3.

Figure 3:
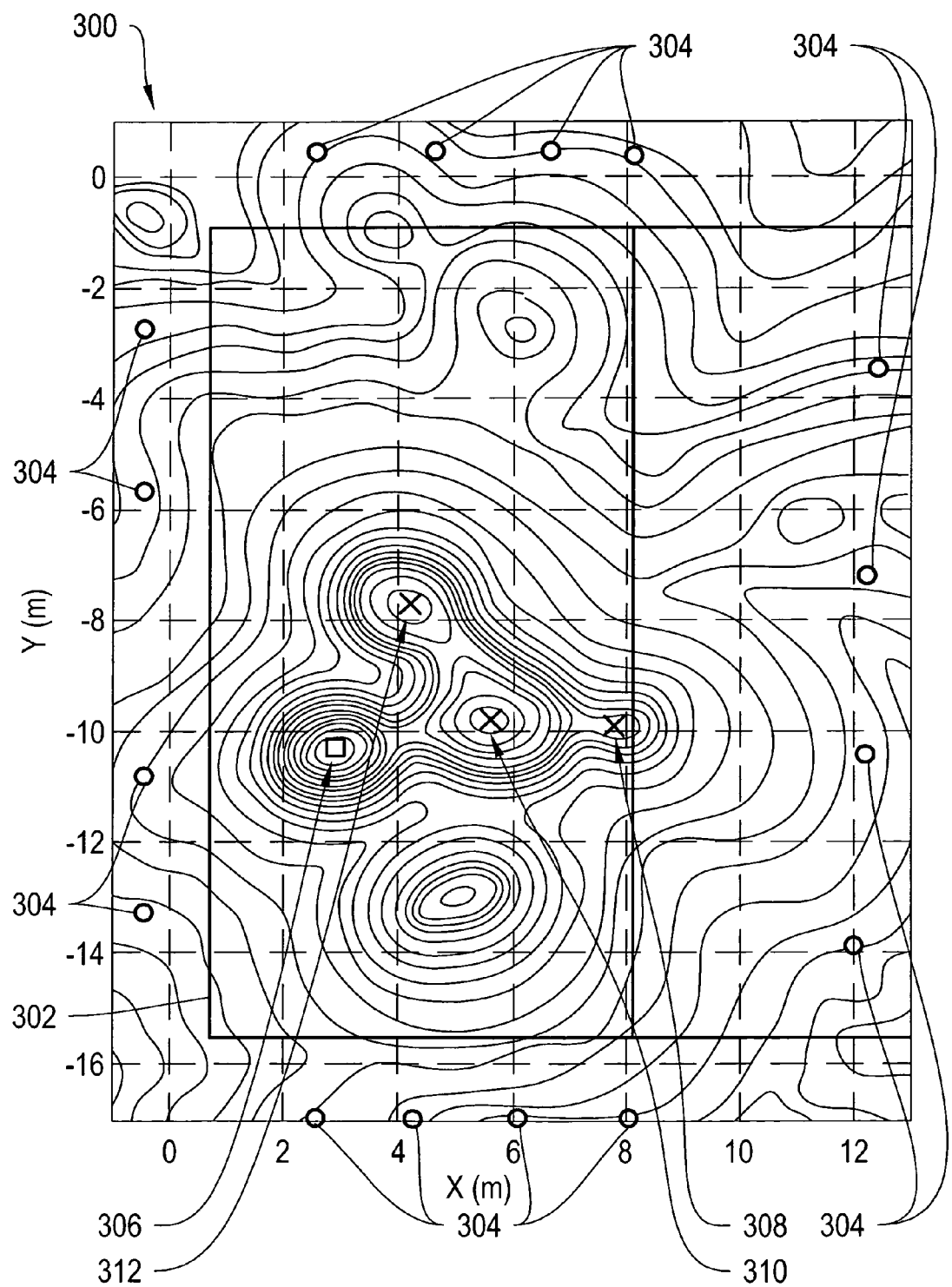
FIG. 3 is an illustrative SART metric image for a test of an embodiment of the present invention in accordance with the principles of the present invention.

FIG. 3 is a chart 300 illustrating the output of the application of the SART algorithm to a set of received signals over a region of interest. The region of interest includes a room 302 outlined by black lines, which represent the walls of the room 302. Circles around the periphery indicate the position of receiving antennas 304. The room includes a transmitter (labeled as a square) as well as metal blackboard 308, an electrical conduit 310, and a metal pipe leg of a work bench 312. The blackboard 305, conduit 310, and pipe leg 312 each serve as significant signal reflectors and thus appear as relative maxima on the chart, along with the transmitter 306.

The SART algorithm for multi-signal fusion has several advantages over known locator techniques. First, the frequency samples need not be evenly spaced. Additionally, there is no requirement for the transmitter time offset $t_o$ be known or estimated. Also, the transmitter waveform, the frequency response of the transmitter antenna, and the frequency response of the receiving antennas need not be known or fixed as long as all receiver antennas and system frequency responses are the same but for an allowed constant phase offset.

Other algorithms that utilize multi-signal fusion to accomplish the goal of constant phase factor invariant, multi-path location estimation are referred to as dedicated signal singular array reconciliation tomography ("DSSART") algorithms. DSSART algorithms generally implement a filter that effectively dedicates the SART algorithm to a specific signal, allowing a system implementing a DSSART algorithm to distinguish between closely located transmitters emitting different waveforms.

There are many potential filtering schemes, each with particular advantages and disadvantages. In each case, it is assumed that the nearly exact form of the direct path received signal ("DPRS"), the transmitted signal as it would appear when received without contamination by any environmental elements, is known. Using DSSART, when a signal is received, it is passed through a filter that applies the inverse of the DPRS Fourier spectrum (i.e. it is deconvolved by the DPRS time signal), typically by division in the Fourier domain. The filtered signal may also be referred to as the "normalized signal." The following four algorithms all use versions of DSSART, and take advantage of the fact that after alignment of the received signals, all received signals contain a Fourier domain sinusoid having the same "frequency", that is, the same number of periods per Hertz in the Fourier domain representation:

State Space SART ("SSSART") uses a multi-input spectral estimator to assess the total support of all inputs of a particular periodic component in the Fourier domain. The result of this analysis is a list of embedded Fourier domain sinusoidal components and their respective amplitudes. By finding the largest common Fourier domain sinusoidal component at each scan position, one can next generate a metric image as with SART based upon the magnitude of this largest component. Furthermore, the periodicity of the Fourier domain sinusoid indicates the relative time delay since transmission of that component (to within the ambiguity of the aliasing introduced by the periodicity of the transmitted waveform). Hence, by comparing these periodicities one can determine which of several peaks is the actual location of the direct path source.

Filtered SART ("FSART") uses a narrow pass-band filter through which all normalized and aligned signals are passed. This approach is less computationally costly than the SSSART approach, although FSART has comparatively reduced performance in high amplitude and near-target multi-path applications due to a lack of model-based super-resolution properties. The filtered signals in FSART are used to form the columns of a matrix, and a metric image is formed from the primary singular value as before for SART. By scanning the center frequency of the filter, or, alternatively, fixing the filter and scanning an additional alignment parameter representing the globally fixed but unknown transmitter time offset, one could define a new metric surface—each point of which represents a measure of the maximum of single-path contributions from all received signals for all possible transmitter time offsets. Because of the unknown phase offsets, this reconciliation of common components is again best accomplished by applying a SART metric strategy in which the largest singular value of the matrix formed from each column of filtered data is used as the measure.

DFT Array Reconciliation Tomography ("DART") is a variation on the FSART approach that avoids the time/complexity cost of SVD processing in the last step of FSART, and simplifies the time-scan procedure by introducing additional approximations to the implementation of the overall DSSART strategy. DART operates generally like FSART. In DART, the chosen narrow-band Fourier-domain-sinusoid selective filter has a center frequency of 0 (the DC component is passband center). This implementation reduces the computational burden of the linear filtering to essentially its minimum. Now, in the scanning process, upon assumption of the source location and upon assuming the correct transmitter time offset parameter, there will be a complex valued DC component at the output of each such filter, $V_n$. However, the $V_n$ do not share identical phases because of local oscillator offsets. However, the sum of the absolute values of the $V_n$ is independent of the phases of the individual components. This in effect implements the phase independence of an SVD reconciliation as used in the general FSART procedure and agrees with its value exactly for the case of a single direct path signal. In the case of strong or near-target multi-path effects that full SART processing may become more advantageous.

PSART is related to the filtering variations of DSSART described above, however it uses a less stringent signal model yielding a tradeoff of reduced computation complexity for reduced performance. By selecting a transmitted wave with symmetric carrier amplitudes across the waveform bandwidth, or by premultiplying the received Fourier domain signal to obtain this symmetry, one obtains a range and time offset rephased received signal matrix which is complex conjugate symmetric. Hence, on concatenating a rephased signal matrix with its complex conjugate, one obtains again a matrix which ideally becomes singular for correct rephasing. Thus rephasing by assumed transmitter location and time offset can be again guided by the maximization of a metric related to a measure of singularity such as provided by the leading singular value of an SVD decomposition.

Figure 4:
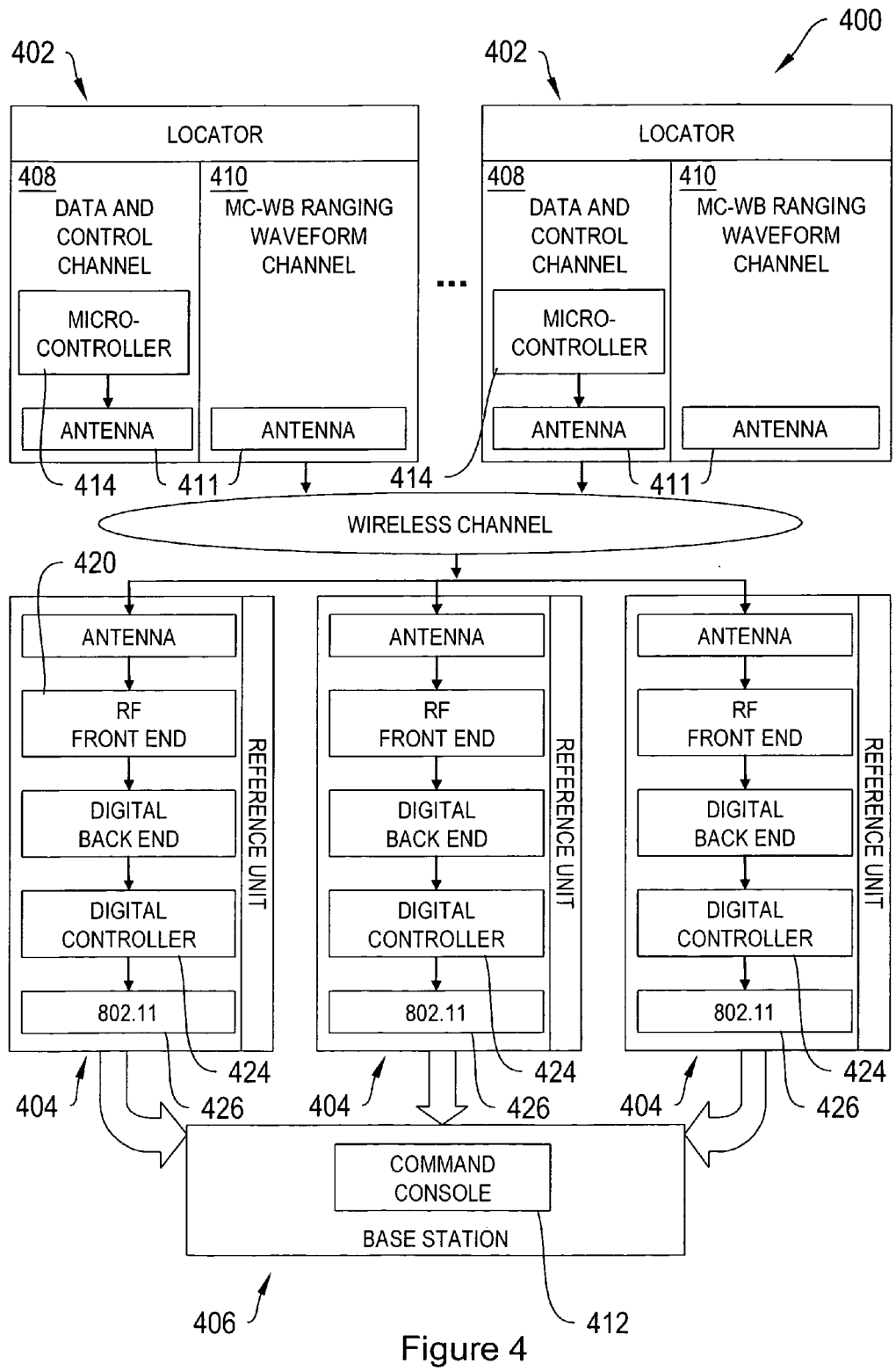
FIG. 4 is an illustrative embodiment of a locator system in accordance with the principles of the present invention.

FIG. 4 is a block diagram of an illustrative embodiment of locator system 400, according to an embodiment of the invention. The system includes locator devices 402, reference units 404 (which serve as location signal receivers), and a base station 406. The locator devices 402 may be worn by, for example, first responders at an emergency scene. The exemplary system shown in FIG. 4 may support up to 100 locators. The displayed illustrative locator 402 contains two main sections, a data and control channel 408 handling the overall control of the locator and supporting such functions as the distress feature and diagnostics, and ranging waveform electronics 410 generating a Multi Carrier-Wide Band ("MC-WB") signal. In this embodiment, the signals from the locators 402 are received by reference units 404 deployed inside and/or outside of a building. As described above, the reference units 404 communicate with the base station 406 containing a command and control console 412 to display the location of the locator devices 402. Each of the main system components are described in more detail in the following discussion.

As mentioned above, the exemplary locator devices 402 comprise two separate sections, a data and control channel section 408 and a MC-WB ranging waveform section 410. The data and control channel 408 contains a microcontroller 414 responsible for the overall control and management of the locator system 400. Some of the functions controlled by the microcontroller 414 include diagnostic and health monitoring, power-management of locator hardware to maximize battery life, implementation of a time division multiplex scheme for transmission of the ranging waveform, detection of non-movement using a 3-axis accelerometer, transmitting of first responder distress signal, and transmitting other locator information (i.e. temperature, battery condition, and physiological information about the status of the first responder such as heart rate, respiration rate, oxygen saturation, activity and posture).

The ranging waveform electronics 410 generally generates a waveform, which in turn drives a digital to analog converter. The baseband output of the digital to analog converter is then up-converted to create a transmitted RF signal. Each channel 408 and 410 may have its own antenna 411, or it may share a common antenna 411.

The reference units 404 in the exemplary locator system of FIG. 4 could be deployed around a building or incident site. In some circumstances, they may also be deployed within a building or incident site. The reference units 404 receive the ranging waveform signals from the locator devices 402 in or around the site to be monitored. The reference units 404 include an RF front end 420, a digital back end 422 including high speed analog to digital converter, a digital controller board 424, and an 802.11 wireless transceiver 426. The incoming ranging signals are sampled, processed, and transmitted to the base station. Each reference unit may include multiple spaced apart antennas to provide multiple channels of data per unit. In such implementations, a multiplexing scheme is employed to sequentially monitor signals received at each antenna.

In one implementation, the reference units 404 receive a reference signal from the base station 406 for synchronization purposes. The reference signal is received at the front end 420 of the reference unit 404 and is processed along with signals received from the locator devices 402. As the locations of the reference units 404 and base station 406 are known, each reference unit can accurately predict the expected phase delay in the signal. Each reference units 404 can use this information to analyze the processed reference signals to determine time delays introduced by the signal processing at that specific reference unit. As the reference signal is processed in the same fashion as received locator signals, any processing delays imparted by the processing of the reference signal will also be imparted on the received locator signals. Each reference unit then uses its respective determined processing time delay to correct for such delays in the processed location data.

The base station 406 is generally responsible for receiving the processed ranging signals from the reference units 404. A processor 411 on the base station 406 applies signal processing algorithms, such as those described above, to determine the 3D location of each of the locator units. This information is combined with the locator and wearer information (distress, non-movement, diagnostics, physiological information about the status of the wearer such as heart rate, respiration rate, oxygen saturation, activity and posture) received over the data channel and then displayed on the command console 412. As described above, in various implementations, the base station 406 determines locator device 402 locations using the SART algorithm.

The SART algorithm includes five basic processing stages: computing fast fourier transforms (FFTs) of received signals, signal matrix rephasing, QR decomposition, bidiagonalization, and diagonalization. The latter three of these processes make up the primary components of Singular Value Decomposition process.

The computational burden associated with the SART algorithm may be described as the number of arithmetic operations required for a single SART scan. This figure can be itemized into a list of operation counts for each stage. Another important metric is the amount of data transferred between stages, which has implications related to memory and interface bandwidth requirements. These operation counts and bandwidth requirements, which are discussed below, will be functions of the size of the signal matrix, m-by-n, where n is the number of receive elements, and m is the number of subcarrier tones in the transmitted signal. Some of them will also be functions of the number of locations in the SART scangrid, G, or the number of ADC samples, N, collected at each receive element.

In the one example implementation of SART, sixteen receive elements are used, and 103 sub-carrier tones are transmitted. The signal matrix therefore has dimensions m-by-n equals 103-by-16. A moderately sized scan-grid, perhaps for a small building, consists of G=10,000 points. The number of samples collected for each receive element is N=8192. Using these figures, the operation and data counts from above can be calculated. Table I summarizes these values.

TABLE 1

OPERATION AND DATA OUTPUT COUNTS
FOR SART PROCESSING STAGES

| PROCESSING STAGE | OPERATIONS [MILLIONS] | DATA OUT [MB] |
|---|---|---|
| Fast Fourier Transform | 0.1065 | 0.0132 |
| Rephasing | 19.78 | 26.37 |
| QR Decomposition | 600.1 | 2.176 |
| Bidiagonalization | 131.1 | 0.496 |
| Diagonalization | 32.00 | 0.256 |

Based on the data in Table 1, the QR decomposition and bidiagonalization stages represent the bulk of the SART computational burden. Thus, in the example implementation, these processes are implemented on a custom hardware co-processor. The rephasing stage, though not computationally intensive, produces many rephased signal matrices for each input signal matrix. In order to reduce the amount of data transferred from the host to the co-processor system, the rephasing stage was also selected for hardware implementation on the co-processor. The remaining portions of the SART algorithm were assigned to the host computer, e.g., a personal computer or a general purpose DSP type processor. The FFT stage was assigned to the host in order to allow for manipulation of the frequency domain signal data before SART processing. This allows for various calibration and synchronization corrections to be applied by the host. The diagonalization stage was assigned to the host computer because it involves algorithms that are both sequential and iterative, and therefore better suited to a sequential processor. Using this partitioning, the number of operations assigned to the host computer was reduced by more than 95%. This corresponds to a potential speed-up of more than 20×, without modifications to the host.

Figure 5:
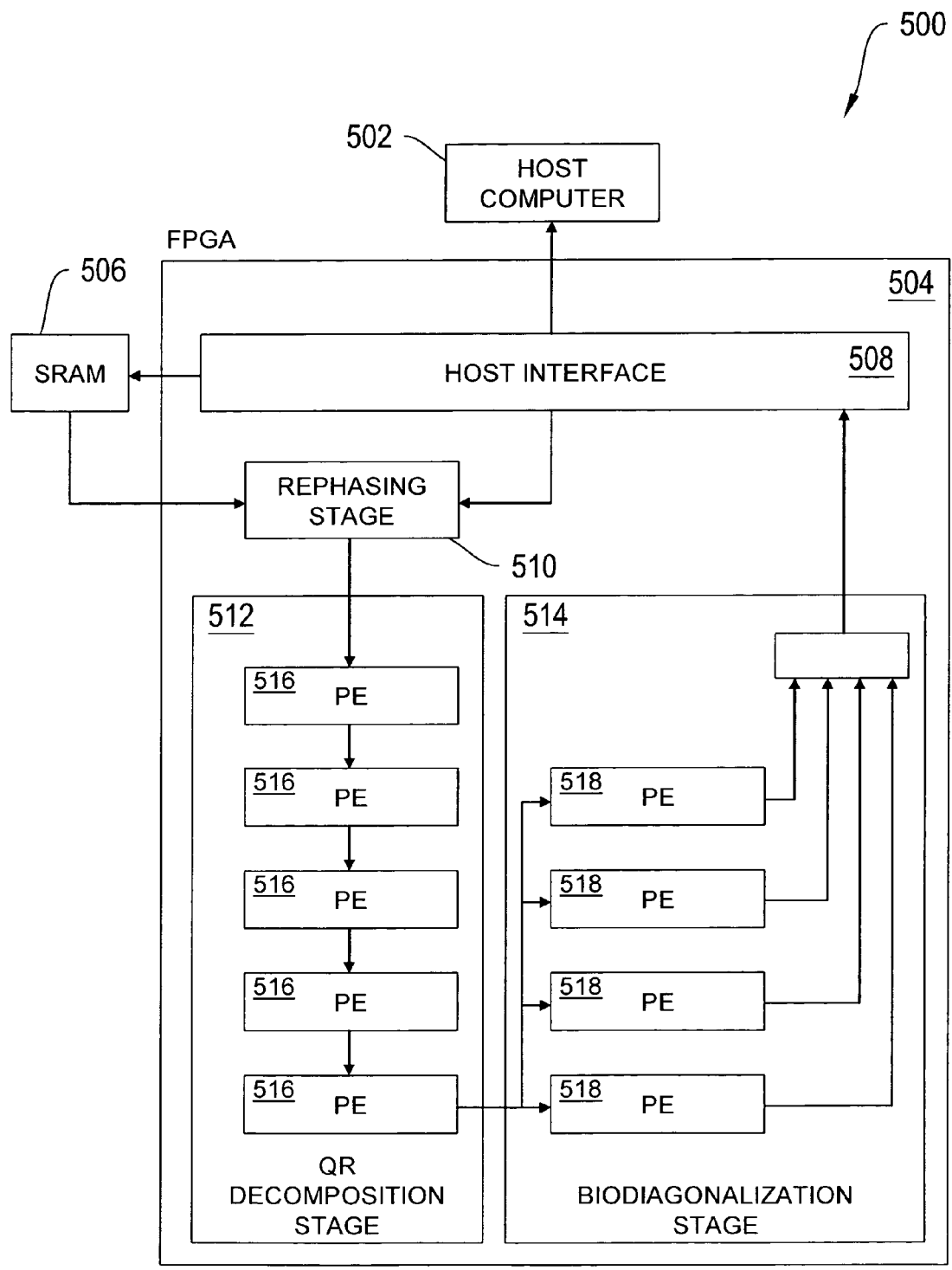
FIG. 5 is a block diagram of a suitable system architecture for the base station of FIG. 4, according to an illustrative embodiment of the invention.

FIG. 5 is a block diagram of a suitable system 500 architecture for the base station 406 of FIG. 4, according to an illustrative embodiment of the invention. The system 500 includes a host computer 502, a co-processor 504, and external memory 506. As described above, the host computer 502 may be a general purpose processor or general purpose DSP. For example, the host computer 502 may include a PENTIUM 4-based processor running at 3 GHz, and executing LAPACK (linear algebra package) routines. The host computer 502 is programmed to manage the overall location detection process, including scanning a target area, providing a user interface, and outputting results to users. The host computer 502 is also configured to carryout the FFT and diagonalization portions of the SART algorithm.

In one implementation, the co-processor 504 is an FPGA. For example, and without limitation, in one specific implementation, the co-processor 504 is built using a VERTEX-4 SX55 FPGA made available by Xilinx, Inc. or San Jose, Calif. Communications between the co-processor 504 and the host computer 502 are transmitted through a PCI adapter. The functionality of the co-processor can be broken down into four primary logic blocks, a host computer interface 508, a rephasing stage 510, a QR decomposition stage 512, and a bidiagonalization stage 514. In some implementations, several co-processors 504 are used in parallel.

The host computer interface 508 communicates both with the host computer 502 over a PCI compatible integrated circuit, as well as with the memory 506, to retrieve static data, such as signal rephasing values and other constants. The rephasing stage 510 carries out an element-wise multiplication of a received signal matrix with a phase reference matrix stored in the memory 506. The phase reference matrix is a set of complex exponentials that describe the frequency-dependent phase shifts for the current scan grid location.

The QR decomposition stage 512 includes several processing elements 516 that process the results of the rephasing stage 510 in a linear fashion. To improve utilization of logic elements, each processing element may include multiple processing elements that share a vector processor unit. The QR decomposition stage 512 decompose the rephased signal matrix into an orthogonal matrix and a triangular matrix for processing by the bidiagonalization phase 514. Unlike in the linear processing flow used in the QR decomposition phase 512, the bidiagonalization stage 514 includes separate processing elements 518 operating in parallel. The output of the bidiagonalization phase 514 is communicated back to the host computer 502 for diagonalization, metric evaluation, and location output.

In other embodiments of the invention, the roles of transmitter and receiver can be reversed. That is, the device to be located could serve primarily as a receiver, receiving signals from synchronized transmitters having known locations. The same processing described above can be applied to the signals received by the single receiver to identify its own position. That is, by scanning a set of potential locations, the receiver can identify its actual location by finding a location at which the frequency dependent phase shifts of the received signals can be canceled out for a sufficient number of transmitters.

Principles described herein may also be used for applications outside of position determination. For example, they may be used for active and passive multi-static radar applications, optical and radio astronomy, and Sonar systems. In various ones of the implementations described herein, as described further in the document attached behind Tab A, the transmitter may be replaced with a signal reflector or a signal repeater.

The embodiments described above have generally assumed that there is one transmitter to be located. However, the systems and methods described herein may also be used to simultaneously locate multiple transmitters in a region of interest. In one embodiment, as many as 100 receivers may be received at the same time. In one multi-transmitter location system, time is divided into a series of time slots. Each transmitter is assigned a regular time slot in the series. The base station, in one implementation, transmits a signal for synchronizing the clocks of the transmitters and receivers. The receivers receive the time-multiplexed signal transmitted by the transmitters and extract each transmitter's signal from the respective time slots. Alternatively, the signal differentiation can be carried out by the base station after receiving data about the full signal from the receivers. Then the base station analyzes each transmitter's respective signal using any of the methodologies described above.

In other embodiments of the system that are configured for locating multiple transmitters, each transmitter is assigned its own location wave form. For example, each transmitter is assigned a set of carrier frequencies at which to transmit. In one implementation, the carriers are interleaved and do not overlap one another. The assignments of carrier frequencies are known by the base station. In one implementation, the base station conducts separate scans of the region of interest as described above using range rephased matrices that include the carriers of each respective transmitter. In another implementation, the base station scans the region with a matrix that includes the carrier frequencies of all transmitters. Then after detecting positions of relative maxima based on a singular value decomposition of the matrix at the positions, the signal components in the U matrices formed during the singular value decomposition at the respective identified positions are compared to the known assignment of carrier frequencies to the transmitters to match transmitters with locations.

While illustrative embodiments of the invention are described above, it will be apparent to one skilled in the art that various changes and modifications may be made therein without departing from the invention.

What is claimed is:

1. A system for locating an object, comprising:
   a transmitter for transmitting a location signal, x(t);
   a plurality of repositionable receivers, where n is the number of receivers, for positioning about a region in which the transmitter is located, each repositionable receiver including a transceiver for receiving the location signal and for transmitting data representative of the received location signal, $R_n(t)$, as it is received by the $n^{th}$ respective receiver; and
   a base station including a transceiver for receiving the representative data transmitted by at least a plurality of the repositionable receivers and a processor for collectively processing the representative data based on a plurality of potential transmitter locations, including reflector locations, to identify at least one of the potential transmitter locations as a likely transmitter location,
   wherein said processor is configured to collectively process the representative data by:
   creating a matrix of range rephased signals, $R'_n(t)$, for the plurality of location signals received at the respective repositionable receivers for each of the plurality of potential transmitter locations such that $R'_n(t)=R_n(t+\hat{t}_n)$, where $\hat{t}_n$ is the signal delay expected if the transmitter were in fact located at a potential location; and
   identifying at least one potential location of the plurality of potential locations as the likely transmitter location, based on the range rephased signals in the matrix being closest to frequency independent and therefore varying only by a complex scalar factor associated with each respective receiver.

2. The system of claim 1, wherein the base station processor processes the representative data using a matrix rank revealing process.

3. The system of claim 1, wherein the base station processor processes the representative data using a singular value decomposition process.

4. The system of claim 1, wherein the base station comprises a display for displaying the at least one identified position.

5. The system of claim 1, wherein identifying a likely transmitter location comprises identifying at least one potential location of the plurality of potential locations at which the signals received by the repositionable receivers are closest to differing by respective constant phase and amplitude factors.

6. The system of claim 1, wherein the representative data corresponding to a received signal comprises a Fourier domain representation of the received signal.

7. The system of claim 1, wherein the representative data corresponding to a received signal comprises samples of the received signal.

8. The system of claim 1, wherein the system further comprises a second transmitter for transmitting a second location signal.

9. The system of claim 8, wherein each repositionable receiver receives the second location signal, and distinguishes the location signal and the second location signal based upon a predetermined timing difference between the location signal and the second location signal, and wherein each repositionable receiver's transceiver transmits data representative of the received location signal and the second location signal as they are received by the respective receiver.

10. The system of claim 8, wherein each repositionable receiver receives the second location signal, and distinguishes the location signal and the second location signal based upon a predetermined difference in frequencies of the location signal and the second location signal, and wherein each repositionable receiver's transceiver transmits data representative of the received location signal and the second location signal as they are received by the respective receiver.

11. The system of claim 8, wherein each repositionable receiver receives the second location signal, and wherein each repositionable receiver's transceiver transmits data representative of the received location signal and the second location signal as they are received by the respective receiver.

12. The system of claim 1, wherein the system further comprises a plurality of transmitters for transmitting a plurality of location signals.

13. A method for locating objects, the method comprising the steps of:
    transmitting a location signal, x(t), using a transmitter;
    receiving the signal using a plurality of receivers positioned about the transmitter, where n is the number of receivers;
    generating by each of the plurality of receivers signal data representing the signal, $R_n(t)$, received by each of the n respective receivers;
    transmitting by the plurality of receivers the signal data to a processor; and
    receiving and collectively processing the signal data based on a plurality of potential transmitter locations, including reflector locations, to identify at least one of the potential transmitter locations as a likely transmitter location,
    wherein processing the signal data comprises:
    creating a matrix of range rephased signals, $R'_n(t)$, for the plurality of location signals received at the respective repositionable receivers for each of the plurality of potential transmitter locations such that $R'_n(t)=R_n(t+\hat{t}_n)$, where $\hat{t}_n$ is the signal delay expected if the transmitter were in fact located at a potential location; and
    identifying at least one potential location of the plurality of potential locations as the likely transmitter location, based on the range rephased signals in the matrix being closest to frequency independent and therefore varying only by a complex scalar factor associated with each respective receiver.

14. The method of claim 13, wherein processing the signal data comprises generating a matrix including the unification of the signal data from a plurality of the receivers; and applying an iterative algorithm to the matrix.

15. The method of claim 13, wherein processing the signal data comprises applying a signal matrix rank revealing process.

16. The method of claim 13, wherein processing the signal data comprises applying a singular value decomposition to the signal data.

17. A non-transitory computer readable medium encoding computer readable instructions, which, upon execution by a processor cause the processor to carry out a method comprising:
receiving signal data $R_n(t)$ corresponding to a location signal received by each of a plurality of mobile receivers, wherein the location signal originated from a transmitter, and n is the number of the respective mobile receiver; and
collectively processing the signal data based on a plurality of potential transmitter locations, including reflector locations, to identify at least one of the potential transmitter locations as a likely transmitter location,
wherein processing the signal data comprises:
creating a matrix of range rephased signals, $R'_n(t)$, for the plurality of location signals received at the respective mobile receivers for each of the plurality of potential transmitter locations such that $R'_n(t)=R_n(t+\hat{t}_n)$, where $\hat{t}_n$ is the signal delay expected if the transmitter were in fact located at a potential location; and
identifying at least one potential location of the plurality of potential locations as the likely transmitter location, based on the range rephased signals in the matrix being closest to frequency independent and therefore varying only by a complex scalar factor associated with each respective mobile receiver.

18. A system for locating an object, comprising:
a plurality of transmitters, where n is the number of transmitters, for positioning about a region in which a receiver is located, each mobile transmitter including a transceiver for transmitting a location signal x(t);
a mobile receiver for receiving the plurality of location signals; and
a processor for collectively processing data representative of signals $R_n(t)$ received by the receiver from the $n^{th}$ mobile transmitter based on a plurality of potential receiver locations to identify at least one of the potential receiver locations as a likely receiver location,
wherein said processor is configured to collectively process the representative data by:
creating a matrix of range rephased signals, $R'_n(t)$, for the plurality of location signals received from the respective transmitters for each of the plurality of potential receiver locations such that $R'_n(t)=R'_n(t+\hat{t}_n)$, where $\hat{t}_n$ is the signal delay expected if the receiver were in fact located at a potential location; and
identifying at least one potential location of the plurality of potential locations as the likely receiver location, based on the range rephased signals in the matrix being closest to frequency independent and therefore varying only by a complex scalar factor associated with each respective transmitter.

19. The system of claim 3, wherein the processor identifies the likely transmitter location as that resulting in a largest singular value of a range rephased signal matrix among potential transmitter locations.

20. The method of claim 16, wherein processing the signal data comprises identifying the likely transmitter location as that resulting in a largest singular value of a range rephased signal matrix among potential transmitter locations.

\* \* \* \* \*

UNITED STATES PATENT AND TRADEMARK OFFICE
CERTIFICATE OF CORRECTION

PATENT NO. : 8,928,459 B2
APPLICATION NO. : 12/664844
DATED : January 6, 2015
INVENTOR(S) : Cyganski et al.

Page 1 of 1

It is certified that error appears in the above-identified patent and that said Letters Patent is hereby corrected as shown below:

On the Title Page:

(75) Inventors, line number 4, please correct the city of inventor William R. Michalson from "Douglas, MA (US)" to --Charlton, MA (US)--.

Signed and Sealed this
Ninth Day of February, 2016

Michelle K. Lee
*Director of the United States Patent and Trademark Office*